May 8, 1934.  R. V. GRAYSON  1,957,883
VACUUM JUICER
Filed Aug. 5, 1931   4 Sheets-Sheet 1

Inventor
Ralph V. Grayson

May 8, 1934.    R. V. GRAYSON    1,957,883
VACUUM JUICER
Filed Aug. 5, 1931    4 Sheets-Sheet 2
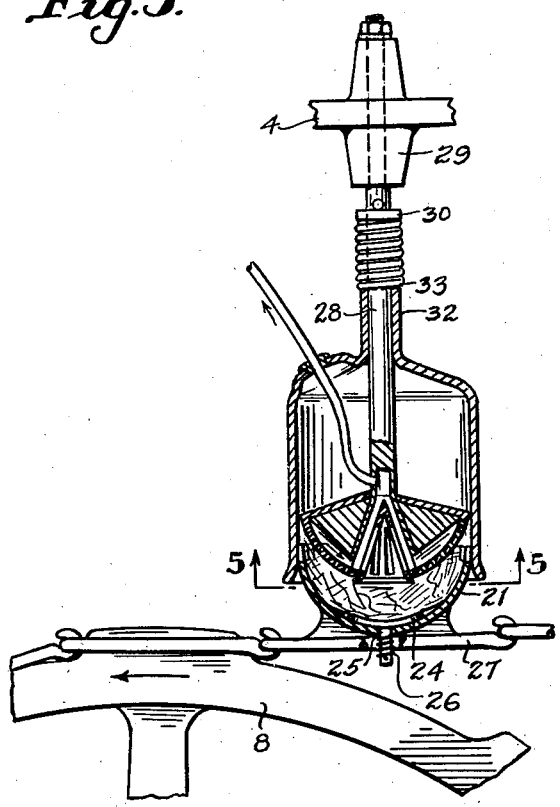
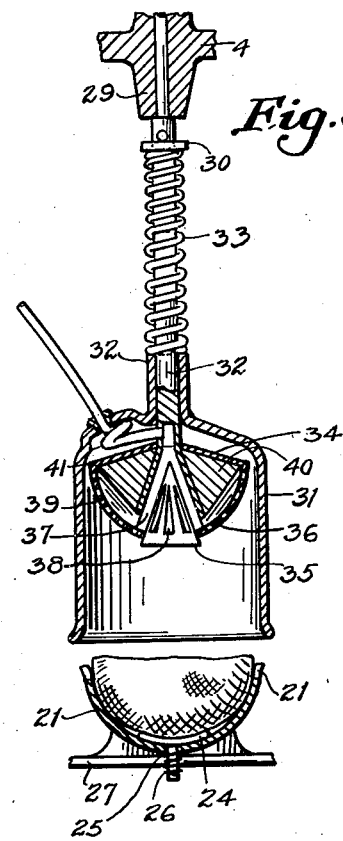
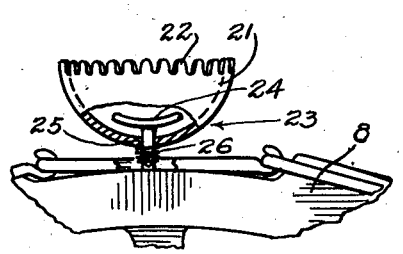
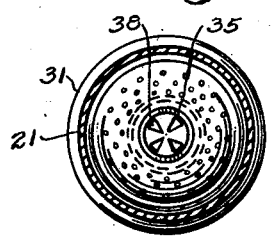
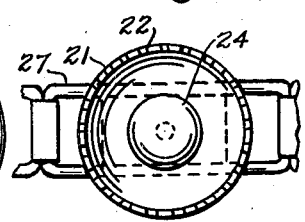
Inventor
Ralph V. Grayson
By Mason Fenwick Lawrence
Attorneys May 8, 1934. R. V. GRAYSON 1,957,883
VACUUM JUICER
Filed Aug. 5, 1931 4 Sheets-Sheet 3
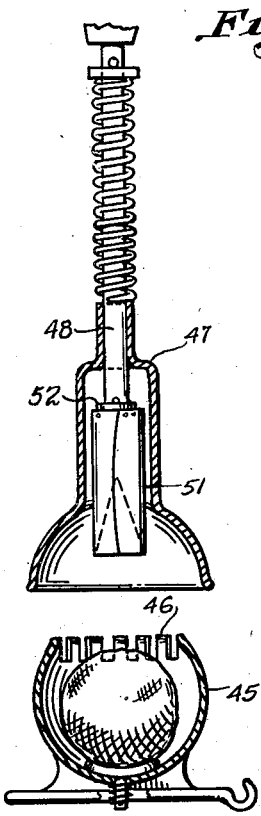
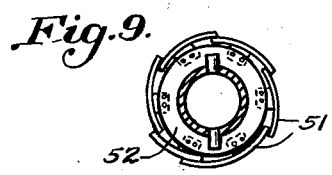
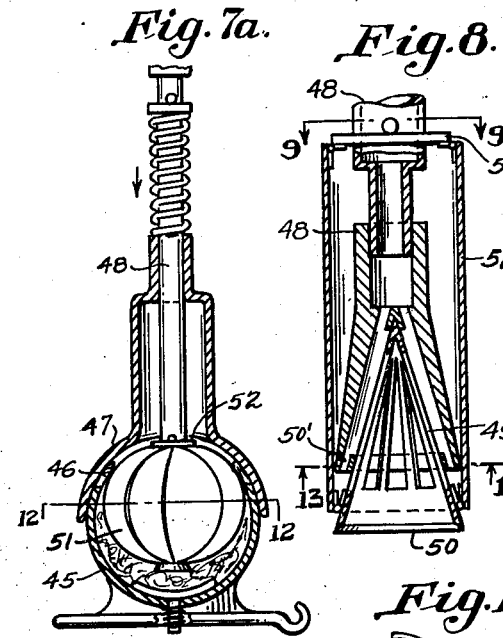
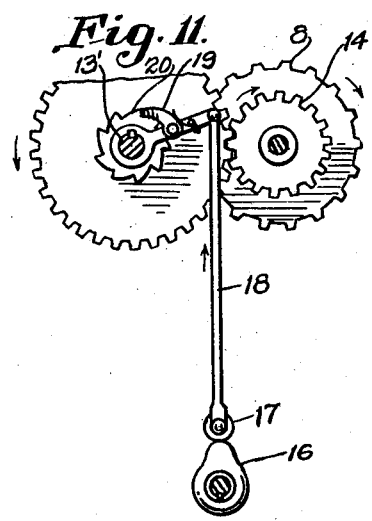
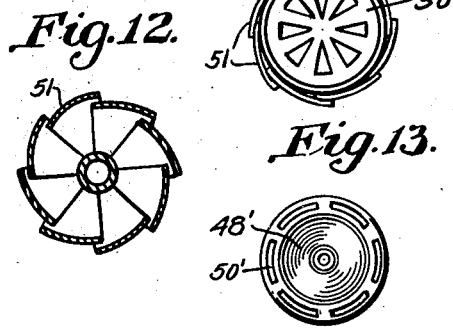
Inventor
Ralph V. Grayson
By Mason Fenwick Lawrence
Attorneys May 8, 1934. R. V. GRAYSON 1,957,883
VACUUM JUICER
Filed Aug. 5, 1931 4 Sheets-Sheet 4

Inventor
Ralph V. Grayson
By Mason Fenwick Lawrence
Attorneys

Patented May 8, 1934

1,957,883

UNITED STATES PATENT OFFICE 1,957,883

VACUUM JUICER

Ralph V. Grayson, Atlanta, Ga.

Application August 5, 1931, Serial No. 555,249

5 Claims. (Cl. 146—3)

This invention relates to apparatus for the extraction of juices from citrus fruits and it has for its general object the complete extraction of the juice from the fruit without at the same time drawing out with the juice portions of the rag, or the bitter oils from the peel.

One of the more specific objects of the invention is to provide means for extracting the juice from the individual fruits through vacuum.

Another object of the invention is the provision of means whereby the fruit is gripped in half or whole form, the rag temporarily segregated, so as to be held intact during the juicing operation, and a vacuum extractor applied to the pulp between the peel and the segregated portion.

A further object of the invention resides in the construction and assemblage of apparatus by means of which the above objects are realized;

Other objects of the invention will appear as the following description of a preferred and exemplary embodiment thereof proceeds.

The invention is described in the following specification including drawings in which:

Figures 3 and 3a are views in vertical section of a pair of juicing units associated with a conveyor, one unit being shown in closed and the other in open position;

Figure 4 is a detail showing the fruit cup with the ejector in elevated position;

Figure 5 is a cross section taken along the line 5—5 of Figure 4 looking upward;

Figure 6 is a plan view of the fruit cup;

Figure 7 is a vertical section through one of the juicing units in a modified form of the invention in which the fruit in its spherical state is acted upon;

Figure 7a is a similar view of the same in operation;

Figure 8 is a detail in vertical section of the cone and its associated expanding element;

Figure 9 is a section taken along the line 9—9 of Figure 8;

Figure 10 is a bottom plan view of the cone and expander shown in Figure 8;

Figure 11 is a detail showing the mechanism for imparting movement to the conveyor;

Figure 12 is a transverse section of the bars shown in Figure 7a;

Figure 13 is a view of the stem head from line 13—13 of Figure 8 looking upward;

Figure 1:
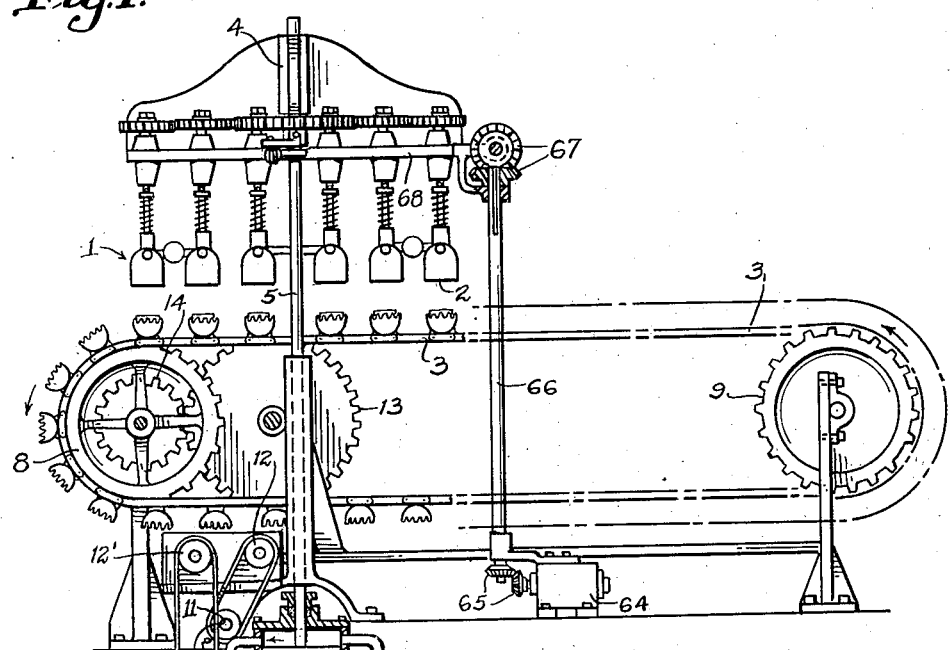
Figure 1 is a side elevation partly in section showing the general layout of apparatus for accomplishing the purposes of the invention.
Figure 2A:
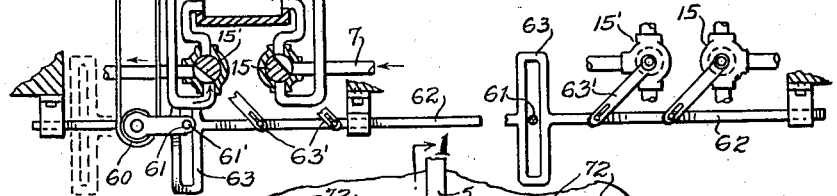
Figure 2a is a detail of the valve synchronizing mechanism.
Figure 2:
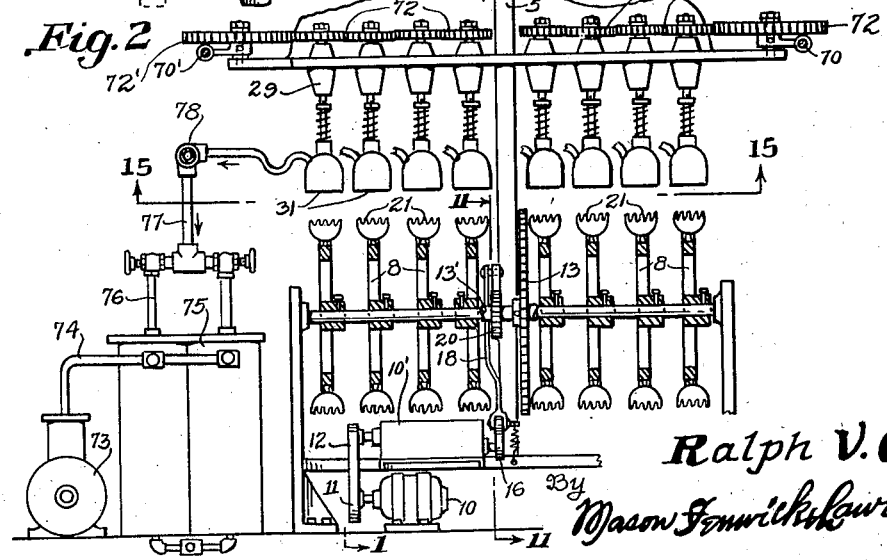
Figure 2 is an end view.

Referring now in detail to the several figures and first adverting to that form of the invention shown in Figures 1 to 6 inclusive, a battery of vacuum juicers 1 is shown cooperating with a set of fruit cups 2, a number of sets of said fruit cups being carried by the conveyor 3, said sets being brought successively into registry with the juicers by suitable intermittent conveyor operating means presently to be described.

The battery of juicers is carried in a frame 4, reciprocable by means such as the piston rod 5 having a piston 6 operated from a suitable source 7 of fluid pressure, or suction, the operation being intermittently timed according to the time requirements of the juicing operation. The conveyor, as illustrated, comprises a plurality of chain belts passing over sprockets 8 and 9, one of the sprockets 8 being driven from a prime mover such as the electric motor 10 through suitable reduction gearing comprising pulleys 11, 12, gear bar 10', cams 16, 17 (Figures 2 and 11) rod 18, pawl and ratchet 19, 20, and gears 13 and 14. Gear 13 and ratchet 20 are mounted on a countershaft 13'. The nature of the reduction gearing in no wise enters in as a component of the invention, the particular gearing selected being within the choice of the mechanic.

The gearing described constitutes means for transmuting the continuous rotary movement of the motor into an intermittent movement of the conveyor. At each descent of the push rod 18, the pawl 19 pushes the ratchet around through an arc, the amplitude of which is determined by the gear ratio in the driving train and which is selected according to the duration of the pause which each set of fruit cups must make beneath the juicers.

A driving connection is shown between the gear train and valves 15, 15' controlling the fluid pressure and exhaust whereby the reciprocation of the piston rod 5 and the battery of juicers becomes a function of the rate of travel of the conveyor. This driving connection includes a pulley 12' on the gear box 10'. Pulley 12' drives another pulley 60. A crank 61 provided with a crank pin 61' is carried by the shaft of pulley 60. This crank operates the bar 62 through the slotted head 63. Slotted cranks 63' on the valve stems are operated by the rod 62.

Referring to the fruit cups, each comprises a substantially hemispherical receptacle 21 has a serrated edge 22, the serrations being in the form of spring fingers adapted to be pressed inwardly upon the peripheral portion of a half fruit resting in said container to hold it in place during the operation of the juicer. The cup has an ejector 23 in the form of a small and preferably dished plate 24 having a stem 25 projecting through a hole in the bottom of the container and having a spring 26 on the outer end of said stem by means of which the ejector is normally biased to a position in which the dished plate lies flat against the bottom of the container.

The fruit cup is mounted upon a link 27 of the chain belt and when the latter passes over the sprocket 8, as shown in Figure 4, the projecting stem co-acts with said sprocket, being forced inwardly, thereby elevating the dished plate 24 and ejecting the exhausted fruit.

Each juicer comprises a hollow stem 28 reciprocable through a guide 29 mounted on the frame 4. The stem 28 has a collar 30, and slidably mounted on said stem below said collar is a hollow substantially cylindrical cap 31 having a sleeve portion 32 between which sleeve portion and the collar 30 a spring 33 is mounted, said spring normally urging the cap 31 toward the lower end of the stem 28. The lower edge of the cap 31 is preferably flared so as to embrace the serrations on the peripheral edge of the fruit cup and to draw them into compressive engagement with the half fruit.

The lower end of the stem 28 is provided with an extractor head 34 of generally semi-spherical contour but somewhat smaller in diameter than the diameter of the fruit cup. The extractor head, as shown in Figures 3 and 3a, comprises a hollow conical portion 35 having an annular knife edge which projects a short distance beyond the semi-cylindrical portion 36 of the extractor head. The wall of the head is rigidly fixed to the cone portion and rigidly connected at its upper edge to the lower end of said stem. The stem 28 is formed with a bore diverging at its lower end into an inverted conical chamber 37 surrounding the conical portion 35 and communicating with the inner portion of said cone by means such as louvers 38, so as to relieve the conical portion of such fruit juice as may incidentally have been imprisoned with the rag when the latter is segregated in said cone. The bottom of the conical portion is open for receiving the rag as the knife edge cuts its way through the fruit upon descent of the extractor head. The lower end of the chamber 37 communicates with the space occupied by the fruit through an annular series of perforations 39. The outer wall of the chamber 37 comprises a solid annular body 40 having radial grooves 41 arranged about its periphery and communicating at their lower ends with the lower portions of the chamber 37. Said grooves may be provided with a series of perforations extending longitudinally thereof, said perforations being preferably progressively smaller as they approach the upper part of the extractor head. The upper ends of the grooves 41 are closed. The chamber 37 together with the annular grooves form a trap within the lower portion of which the juice collects so that while there is any juice left in the fruit, it is directly subjected to suction without the unnecessary induction of air from outside of the fruit. It is for this reason that the series of perforations 39 grow progressively smaller as they approach the cut surface of the half fruit.

Figure 14:
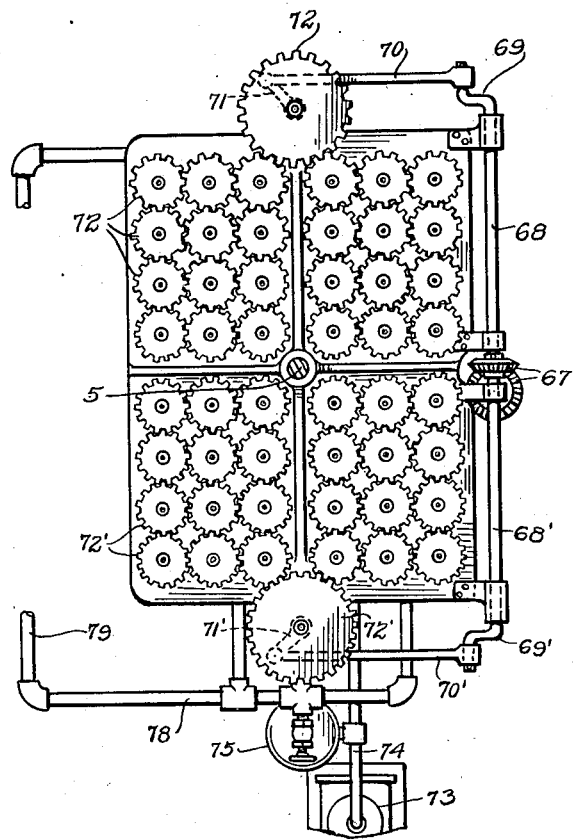
Figure 14 is a plan view of the apparatus shown in Figure 2, parts being broken away.
Figure 15:
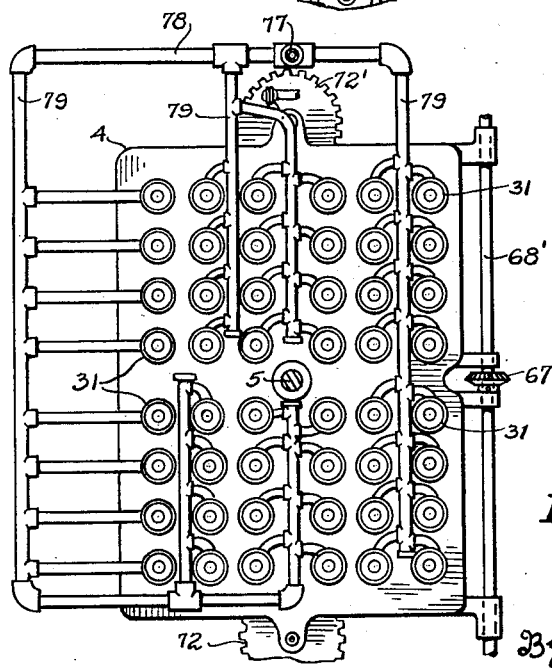
Figure 15 is a cross section taken along the line 15—15 of Figure 2.

Figures 1 and 14 show that after the extractor head has made contact with the fruit, it is given a rotary movement in opposite directions during the extracting operation, so as to break down the pulp and more completely effect the extraction of the juice. This rotary movement is produced by mechanism driven by a motor 64 properly synchronized with respect to the motor 10 or the mechanism driven thereby. The motor 64 through suitable gearing 65, 66, and 67 operates crank shaft 68, 68' and the cranks 69, 69' on these shafts drive the pitmen 70, 70' which in turn operate the gears 72, 72' through the cranks 71, 71'. The gears 72, 72' are in mesh with the gang of gears 72, 72' which are mounted on the stems 28 of the individual juicers.

The suction apparatus comprises a pump 73 and any suitable connections for drawing air from the individual juicers. The pump may be either single or double acting and may or may not be used to supply suction or pressure for operating the piston 6. The connections illustrated comprise pipe 74, connected with the pump, tanks 75, pipes 76, 77, 78 and 79.

In operation, halves of the citrus fruit unpeeled and unbruised are placed in the fruit cups 21 at one end of the conveyor. Automatically, through mechanism previously described, the conveyor stops with the set of fruit cups positioned directly beneath the extractor heads. Synchronously, with the stopping of the fruit cups the juicers descend, the caps 31 telescoping over the serrated edges of the fruit cups and being pressed thereupon through tension of the springs 33 while the extractor head descends further into the pulp, the knife edge of the conical portion 35 cutting down through the pulp and segregating the rag within the conical portion 35 while at the same time, the portion 36 of the extractor head compresses the surrounding pulp. While the extractor head is pressing the pulp, the vacuum draws the juice from the pulp as fast as it is released and the trap construction of the grooves 41 and the chamber 37 permits a seal of juice to collect at the bottom of the chamber 37 and be directly subjected to the vacuum whilesoever there is any juice left in the fruit. While the suction is in progress the extractor head makes the rotary movement above referred to, and the object of the serrated edge 22 is to hold the fruit against rotation while this rotary movement is taking place. This prevents the needless drawing of air by the extractor head which will occur in the absence of these provisions.

As soon as the extractor has been completed, the timing mechanism cuts off the suction, causes the ascent of the battery of juicers and starts the conveyor in motion whereby the fruit cups containing the exhausted fruits are carried to the end of the conveyor. When the fruit cups pass over the sprocket 9, the extractors rise beneath the exhausted fruits loosening the latter so that they fall out of the fruit cups into a chute or other waste receptacle.

The form of the invention above described deals with fruit which has been preliminarily cut in half. The invention is also applicable to whole fruit and a modification is shown in Figures 7, 8, 9, 10, 11, 12 and 13 in which the fruit cup 45 is made deeper than hemispherical so as to receive the entire fruit. This cup has a serrated edge 46 similar to that described in connection with the first form of the invention and for a like purpose. A cap 47 is also provided for compressing the serrations against the fruit. The extractor head comprises a stem 48 having a flared lower portion 48' to which is secured the conical portion 49 through the intermediary of a series of longitudinal presser bars 51 secured to a collar 52 fixed on the stem. These bars are preferably hinged at their ends to the collar and cone. The conical portion 49 terminates in an annular knife edge 50 and when the extractor head is pressed into the fruit the presser bars 51 bulge out into a substantially spherical form compressing the pulp of the citrus fruit and permitting the ready extraction of the juice through vacuum applied in the same manner as has been described in connection with the other modification of the invention. This conical portion is hollow and has the same purpose as the conical portion 35 in the first described form, that is to say, it descends upon the rag as the knife edge 50 cuts through the fruit and retains the rag segregate from the pulp while the juice is being withdrawn.

The flared lower end 48' of the stem is provided with a thickened lower edge slotted as shown at 50.

While I have in the above specification described what I believe to be practical embodiments of my invention, it is to be understood that they are merely exemplary of the principles of the invention and not to be considered limitative in their bearing upon the appended claims.

What I claim is:

1. Apparatus for extracting the juice from citrus fruits comprising a dished receptacle for holding the fruit and means reciprocable with respect to said receptacle for compressing the fruit pulp, said means including a cup member adapted to receive the fruit and receptacle and means reciprocable in said cup member adapted to compress the fruit therein and means for extracting the juice from the pulp by vacuum.

2. Apparatus for extracting juice from citrus fruits comprising a receptacle for the unpeeled fruit a cup adapted to telescope over the receptacle and an extractor head reciprocable in said cup relative to said receptacle for compressing the fruit pulp, said extractor head including an element for segregating the rag from the pulp, vacuum means for extracting the juice from the pulp, and means for imparting oscillating movement to said extractor head when in engagement with said fruit.

3. Apparatus for extracting the juice from citrus fruits comprising a receptacle for said fruit and an extractor head reciprocable relatively to said receptacle, said extractor head being formed with a conical member for surrounding and segregating the rag of said fruit and being provided with a vacuum chamber surrounding said conical member and in communication therewith, said extractor head being formed with channels communicating with said vacuum chamber at the bottom forming a trap, and a suction conduit in communication with said chamber.

4. Apparatus for extracting the juice from citrus fruits as claimed in claim 3, the receptacle having a fruit gripping edge, and a cap yieldably carried by said extractor head telescoping over said fruit gripping edge to hold the fruit in said receptacle.

5. Apparatus for extracting the juice from citrus fruits comprising a fruit cup having a fruit gripping edge, an extractor head reciprocable relative to said fruit cup including a stem, said extractor head including also a conical portion adapted to surround the rag and segregate the same from the fruit pulp as the extractor head extends compressively into said fruit, a cap slidable on said stem and engageable with the fruit gripping edge of said fruit cup for causing the latter to grip the fruit, a spring yieldably supporting said cap to permit further reciprocatory movement of said extractor head when the cap is in telescoped position with respect to said fruit gripping edge, means for imparting oscillating motion to said extractor head while the latter is in engagement with said fruit, and means for applying suction to said vacuum head.

RALPH V. GRAYSON.